(12) United States Patent
Sato (10) Patent No.: US 11,999,194 B2
(45) Date of Patent: Jun. 4, 2024

(54) TIRE

(71) Applicant: TOYO TIRE CORPORATION, Itami (JP)

(72) Inventor: Yoshiki Sato, Itami (JP)

(73) Assignee: Toyo Tire Corporation, Itami (JP)

( * ) Notice: Subject to any disclaimer, the term of this patent is extended or adjusted under 35 U.S.C. 154(b) by 41 days.

(21) Appl. No.: 17/940,043

(22) Filed: Sep. 8, 2022

(65) Prior Publication Data

US 2023/0108343 A1 Apr. 6, 2023

(30) Foreign Application Priority Data

Oct. 4, 2021 (JP) .................. 2021-163216

(51) Int. Cl.
  *B60C 13/00* (2006.01)
  *B60C 11/01* (2006.01)
(52) U.S. Cl.
  CPC ......... *B60C 11/01* (2013.01); *B60C 2011/013* (2013.01); *B60C 2200/14* (2013.01)

(58) Field of Classification Search
  CPC ... B60C 11/0316; B60C 13/02; B60C 13/002; B60C 13/00; B60C 2200/14
  See application file for complete search history.

(56) References Cited

U.S. PATENT DOCUMENTS

2019/0389253 A1 12/2019 Wada
2022/0118796 A1* 4/2022 Sakamoto ............... B60C 11/11

FOREIGN PATENT DOCUMENTS

JP 2019-217920 A 12/2019

* cited by examiner

*Primary Examiner* — Cedrick S Williams
(74) *Attorney, Agent, or Firm* — WHDA, LLP

(57) ABSTRACT

In a tire, a first side block comprises a first recess which opens so as to be directed toward a first circumferential direction, and a second recess which opens so as to be directed toward a second circumferential direction which is opposite the first circumferential direction in a tire circumferential direction. The first side block comprises a first region, a second region, and a first step which is between the first region and the second region and which is formed by a difference in heights by which the first region and the second region protrude.

18 Claims, 9 Drawing Sheets

TIRE

CROSS REFERENCE TO RELATED APPLICATIONS

This application claims the benefit of priority of Japanese application no. 2021-163216, filed on Oct. 4, 2021, which is incorporated herein by reference.

BACKGROUND OF THE INVENTION

Field of the Invention

The present disclosure relates to a tire.

Description of the Related Art

Conventionally a tire might, for example, comprise side block(s) which protrude in the tire axial direction from a sidewall reference surface (e.g., JP2019-217920A). This makes it possible to improve performance with respect to protection (e.g., ability to suppress occurrence of damage in the form of cuts when impacted by rocks, stones, and the like) at the sidewall.

At the tire associated with JP2019-217920A, a first side block comprises a first recess which opens so as to be directed toward a first circumferential direction of the tire circumferential direction, and a second recess which opens so as to be directed toward a second circumferential direction of the tire circumferential direction. This makes it possible to improve performance with respect to traction (e.g., ability of side block surface and/or edge components to produce traction when in contact with sand, rock, mud, snow, and/or the like) regardless of the rotational direction of the tire, due to the fact that traction will be produced by the first recess or the second recess in correspondence to the rotational direction of the tire.

It so happens that while increasing the height(s) by which side block(s) protrude will make it possible to improve performance with respect to protection and performance with respect to traction, it will also cause the weight of the tire to increase. As a result, when the tire is mounted on a vehicle and the vehicle is driven, this may, for example, cause fuel efficiency to worsen.

SUMMARY OF THE INVENTION

It is an object of the present disclosure to provide a tire that makes it possible to suppress increase in weight while permitting achievement of both performance with respect to protection and performance with respect to traction.

There is provided a tire comprising a first side block that protrudes in a tire axial direction from a sidewall reference surface, wherein
- the first side block comprises a first recess which opens so as to be directed toward a first circumferential direction, and a second recess which opens so as to be directed toward a second circumferential direction which is opposite the first circumferential direction in a tire circumferential direction;
- the first recess comprises a first outer recess edge which is inclined with respect to a tire radial direction, and a first inner recess edge which is inclined with respect to the tire radial direction and which is arranged toward an interior in the tire radial direction from the first outer recess edge;
- the first outer recess edge extends so as to be increasingly disposed in the first circumferential direction as one proceeds toward an exterior in the tire radial direction;
- the first inner recess edge extends so as to be increasingly disposed in the first circumferential direction as one proceeds toward the interior in the tire radial direction;
- the second recess comprises a second outer recess edge which is inclined with respect to the tire radial direction, and a second inner recess edge which is inclined with respect to the tire radial direction and which is arranged toward the interior in the tire radial direction from the second outer recess edge;
- the second outer recess edge extends so as to be increasingly disposed in the second circumferential direction as one proceeds toward the exterior in the tire radial direction;
- the second inner recess edge extends so as to be increasingly disposed in the second circumferential direction as one proceeds toward the interior in the tire radial direction; and
- the first side block comprises a first region, a second region, and a first step which is between the first region and the second region and which is formed by a difference in heights by which the first region and the second region protrude.

DETAILED DESCRIPTION OF THE INVENTION

Below, an embodiment of a tire is described with reference to FIG. 1 through FIG. 9. At the respective drawings, note that dimensional ratios at the drawings and actual dimensional ratios are not necessarily consistent, and note further that dimensional ratios are not necessarily consistent from drawing to drawing.

At the respective drawings, first direction D1 is the tire axial direction D1 which is parallel to the tire rotational axis, second direction D2 is the tire radial direction D2 which is the direction of the diameter of tire 1, and third direction D3 is the tire circumferential direction D3 which is the direction that is circumferential with respect to the rotational axis of the tire. Furthermore, tire equatorial plane S1 refers to a plane that is located centrally in the tire axial direction D1 and that is perpendicular to the rotational axis of the tire; tire meridional planes S2, S3 refer to planes that are perpendicular to tire equatorial plane S1 and that contain the rotational axis of the tire.

Toward the interior in the tire axial direction D1 means nearer to tire equatorial plane S1, and toward the exterior in the tire axial direction D1 means farther away from tire equatorial plane S1. The side toward the interior in the tire radial direction D2 is the side which is nearer to the tire rotational axis, and the side toward the exterior in the tire radial direction D2 is the side which is farther away from the tire rotational axis.

First direction D31 of tire circumferential direction D3 is referred to as first circumferential direction D31; second direction D32 which is opposite first direction D31 of tire circumferential direction D3 is referred to as second circumferential direction D32. Moreover, while there is no particular limitation with respect thereto, tire 1 may, e.g., as is the case in the present embodiment, be a tire 1 for which a rotational direction is not indicated. That is, the rotational direction of tire 1 when mounted on a vehicle may be either first circumferential direction D31 or second circumferential direction D32.

Figure 1:
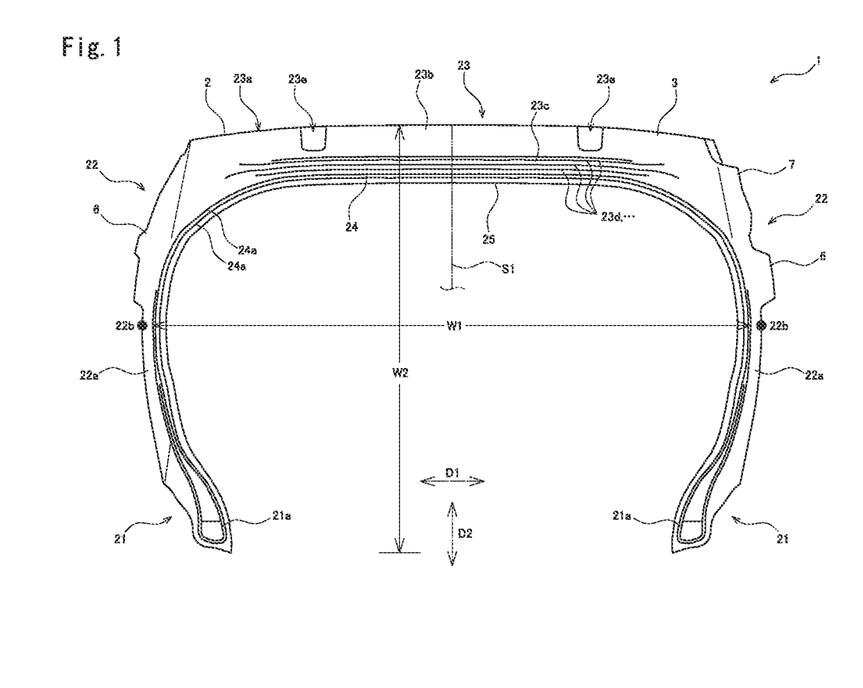
FIG. 1 is a view of a section, taken along a tire meridional plane, of the principal components in a tire associated with an embodiment.

As shown in FIG. 1, tire 1 might, for example, comprise a pair of bead regions 21 which have beads 21a at the interiors thereof; sidewalls 22 which extend outwardly in the tire radial direction D2 from the respective bead regions 21; and tread 23 which has, at the outer end in the tire radial direction D2 thereof, tread surface 23a that contacts the ground and which is contiguous with the respective outer ends in the tire radial direction D2 of the pair of sidewalls 22, 22.

While there is no particular limitation with respect thereto, tire 1 may, e.g., as is the case in the present embodiment, be a pneumatic tire 1, the interior of which is capable of being filled with air. In addition, tire 1 may, for example, be mounted on a rim (not shown).

Note that if the tire 1 is a pneumatic tire, the respective dimensions, positional relationships, relative magnitudes, and so forth that are indicated below should be understood to be as measured under normal conditions when the tire 1 mounted on a normal rim and inflated to normal internal pressure is under no load. A normal rim is that particular rim which is specified for use with a particular tire 1 in the context of the body of standards that contains the standard that applies to the tire 1 in question, this being referred to, for example, as a standard rim in the case of JATMA, or a measuring rim in the cases of IRA and ETRTO.

Furthermore, normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of IRA, or "inflation pressure" in the case of ETRTO.

For example, tire 1 may comprise carcass 24 suspended between pair of beads 21a, 21a; and innerliner 25 that is arranged toward the interior from carcass 24 and that faces the interior space of tire 1 which is or will be filled with air. For example, carcass 24 and innerliner 25 may be arranged in parallel fashion with respect to the inside circumferential surface of the tire over a portion thereof that encompasses bead regions 21, sidewalls 22, and tread 23.

For example, tread 23 may comprise tread rubber 23b which constitutes tread surface 23a, and belt 23c which is arranged between tread rubber 23b and carcass 24. For example, belt 23c may comprise a plurality (four at FIG. 1) belt plies 23d. For example, belt plies 23d might comprise a plurality of belt cords (e.g., organic fiber and/or metal) which are arrayed in parallel fashion, and topping rubber with which the belt cords are covered.

For example, carcass 24 may be made up of at least one (two at FIG. 1) carcass ply 24a. For example, carcass ply 24a may fold back upon itself and wraps about bead 21a so as to envelop bead 21a. Furthermore, for example, carcass ply 24a may comprise a plurality of ply cords (e.g., organic fiber and/or metal) which are arrayed in directions more or less perpendicular to the tire circumferential direction D3, and topping rubber with which the ply cords are covered.

For example, innerliner 25 may have superior functionality in terms of its ability to impede passage of gas therethrough so as to permit air pressure to be maintained. For example, the constitution at sidewall 22 may be such that, as is the case in the present embodiment, innerliner 25 is contiguous with the inside circumferential surface of carcass 24, there being no other member that intervenes between innerliner 25 and carcass 24.

Sidewall 22 may, for example, comprise sidewall rubber 22a which is arranged toward the exterior in the tire axial direction D1 from carcass 24 and which is intended to constitute the outer surface. Moreover, sidewalls 22 comprise, at the outer surfaces thereof, locations 22b which are at the same locations in the tire radial direction D2 as the locations at which tire width is a maximum (more specifically, the locations at which distance W1 between respective exterior points in the tire axial direction D1 of carcass 24 is a maximum). Below, these locations 22b are referred to as tire maximum width locations 22b.

Figure 2:
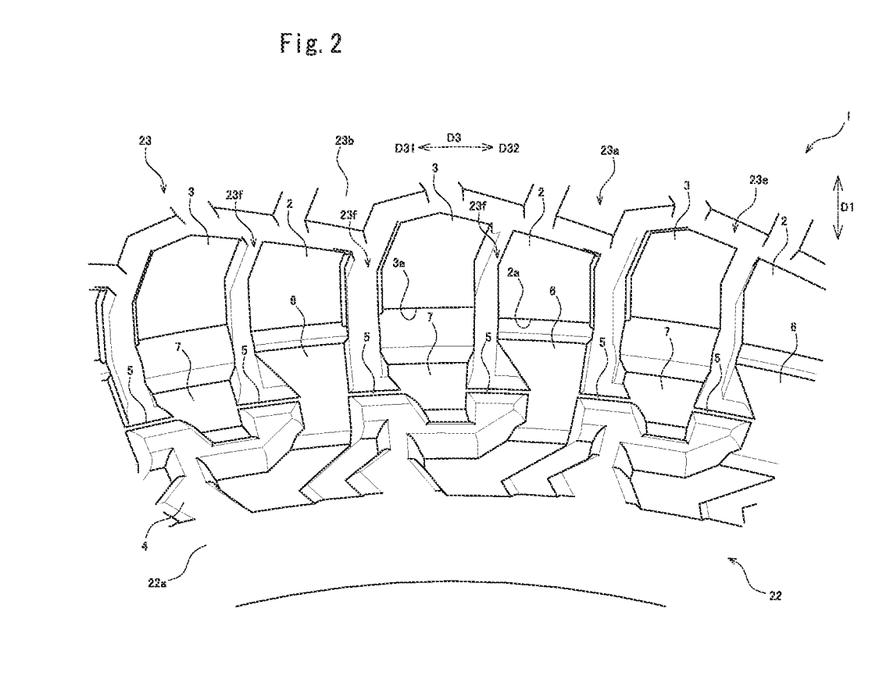
FIG. 2 is a perspective view of the principal components in a tire associated with same embodiment.

As shown in FIG. 1 and FIG. 2, tread rubber 23b may, for example, comprise a plurality of main grooves 23e that extend continuously in the tire circumferential direction D3 along the entire length in the tire circumferential direction D3 of tread surface 23a. Moreover, main groove(s) 23e which of the plurality of main grooves 23e are arranged in outermost fashion in the tire axial direction D1 are referred to as shoulder main groove(s) 23e.

Figure 3:
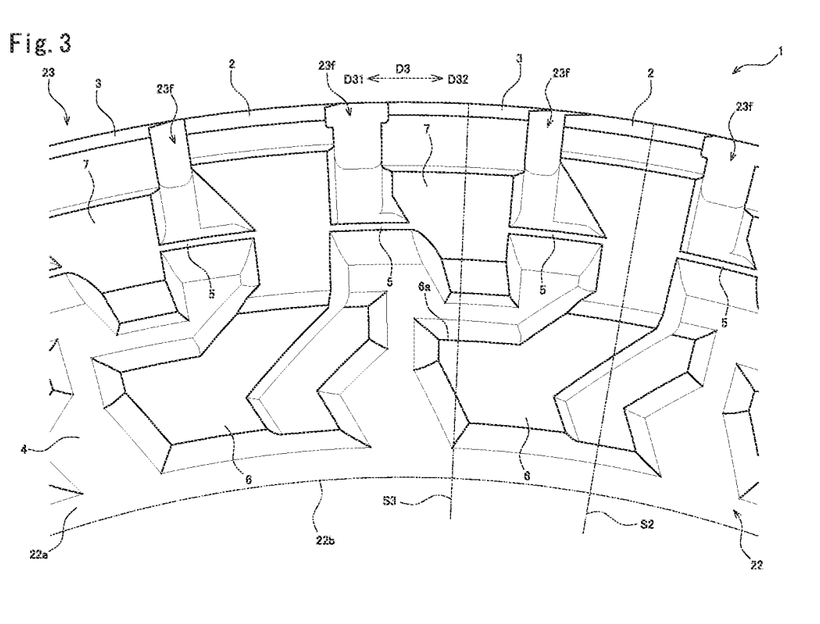
FIG. 3 is a side view of the principal components in a tire associated with same embodiment.

As shown in FIG. 2 and FIG. 3, tread rubber 23b may, for example, comprise a plurality of ancillary grooves 23f which extend to an outer end in the tire axial direction D1 from shoulder main groove 23e; and a plurality of tread blocks 2, 3 which are partitioned by shoulder main groove 23e and the plurality of ancillary grooves 23f.

The plurality of tread blocks 2, 3 might, for example, include first tread block 2; and second tread block 3 which is arranged so as to be separated and in the first circumferential direction D31 from first tread block 2. While there is no particular limitation with respect thereto, first tread blocks 2 and second tread blocks 3 may, e.g., as is the case in the present embodiment, be arrayed in alternating fashion in the tire circumferential direction D3.

Tread blocks 2, 3 may, for example, comprise outer end edges 2a, 3a at the outer end in the tire axial direction D1 of tread surface 23a. While there is no particular limitation with respect thereto, outer end edge 2a of first tread block 2 might, e.g., as is the case in the present embodiment, be arranged so as to be toward the exterior in the tire axial direction D1 from outer end edge 3a of second tread block 3.

The constitution of sidewall 22 associated with the present embodiment will next be described with reference to FIG. 2 and FIG. 3. Note, however, that the constitution of sidewall 22 is not limited to the following constitution.

Furthermore, the constitution of first sidewall 22 which is described below might, for example, be the same as the constitution of second sidewall 22, or might, for example, be different from the constitution of second sidewall 22.

Sidewall rubber 22a of sidewall 22 may, e.g., as is the case in the present embodiment, comprise rubber main body 4, annular projection 5 which protrudes in the tire axial direction D1 from rubber main body 4, and plurality of side blocks 6, 7 which protrude in the tire axial direction D1 from rubber main body 4.

Note that the constitution might, for example, be such that side blocks 6, 7 are provided only at one sidewall 22, or the constitution might, for example, be such that side blocks 6, 7 are provided at both sidewalls 22, 22. That is, the constitution may be such that side blocks 6, 7 are provided at at least one sidewall 22.

The plurality of side blocks 6, 7 may, for example, include first side block 6 and second side block 7 which are adjacent in the tire circumferential direction D3. While there is no particular limitation with respect thereto, first side blocks 6 and second side blocks 7 may, e.g., as is the case in the present embodiment, be arrayed in alternating fashion in the tire circumferential direction D3.

Annular projection 5 may, as is the case in the present embodiment, extend in the tire circumferential direction D3 between first side block(s) 6 and second side block(s) 7. The dimension in the tire radial direction D2 of annular projection 5 might, for example, be constant (here and below understood to mean not only the situation in which this is the same but to also include situations in which this is approximately the same such that there is a difference of ±10% thereat) all along the tire circumferential direction D3. Furthermore, the height by which annular projection 5 protrudes might, for example, be constant all along the tire circumferential direction D3.

At least a portion of side blocks 6, 7 may, e.g., as is the case in the present embodiment, be arranged toward the exterior in the tire radial direction D2 from tire maximum width location 22b. Furthermore, annular projection 5 may, e.g., as is the case in the present embodiment, be arranged toward the exterior in the tire radial direction D2 from tire maximum width location 22b.

As a result, on a snowy road or over muddy or sandy terrain or the like, when the weight of the vehicle causes tire 1 to sink such that it is buried under snow, mud, sand, and/or the like, annular projection(s) 5 and/or side block(s) 6, 7 are able to make contact, and when going over rocky terrain these are able to come in contact with irregular surfaces of rocks. That is, annular projection(s) 5 and side block(s) 6, 7 make contact under bad road conditions such as when on a snowy road or over muddy, sandy, or rocky terrain or the like.

In addition, when snow, mud, sand, or the like is, for example, subjected to shearing by annular projection(s) 5 and side block(s) 6, 7, resistance due to such shearing will cause production of traction. Furthermore, for example, when annular projection(s) 5 and side block(s) 6, 7 come in contact with rock, friction due to such contact will cause production of traction. Thus, when the vehicle is being driven on a snowy road or under bad road conditions, annular projection(s) 5 and side block(s) 6, 7 permit improvement in performance with respect to traction.

Furthermore, annular projection(s) 5 and/or side block(s) 6, 7 may, e.g., as is the case in the present embodiment, be arranged toward the interior in the tire radial direction D2 from tread surface 23a. Where this is the case, annular projection(s) 5 and/or side block(s) 6, 7 will not come in contact with the road surface during normal travel on a flat road.

First side block 6 and first tread block 2 may, e.g., as is the case in the present embodiment, respectively intersect a common first tire meridional plane S2. Furthermore, second side block 7 and second tread block 3 may, e.g., as is the case in the present embodiment, respectively intersect a common second tire meridional plane S3. Note, e.g., as is the case in the present embodiment, that first side block 6 may also intersect second tire meridional plane S3.

The constitutions of side blocks 6, 7 associated with the present embodiment will next be described with reference to FIG. 4 through FIG. 9. Note, however, that the constitutions of side blocks 6, 7 are not limited to the following constitutions.

Figure 4:
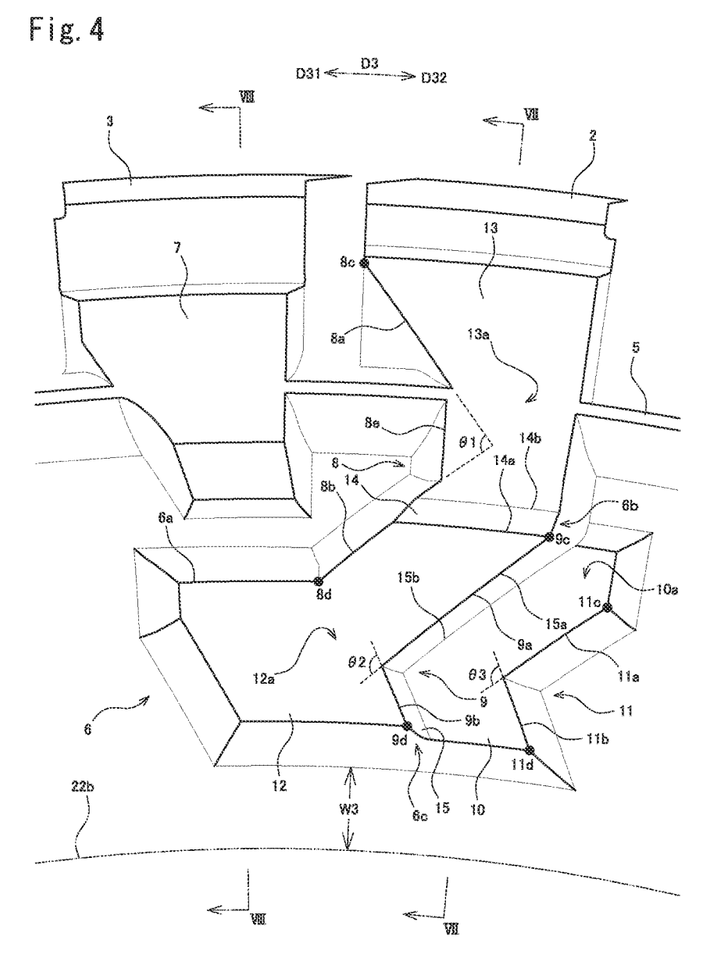
FIG. 4 is a side view of the principal components at a sidewall associated with same embodiment.
Figure 5:
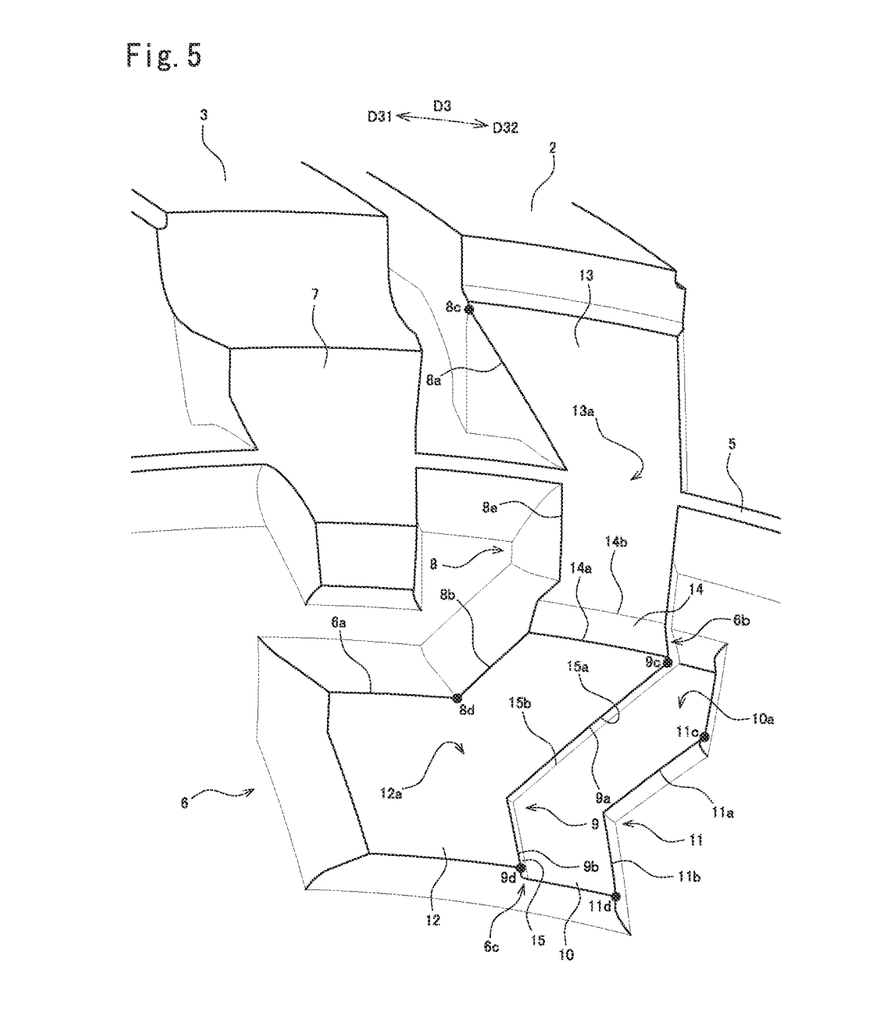
FIG. 5 is a perspective view as seen when viewed toward a location to the right from a location to the left of a sidewall associated with same embodiment.
Figure 6:
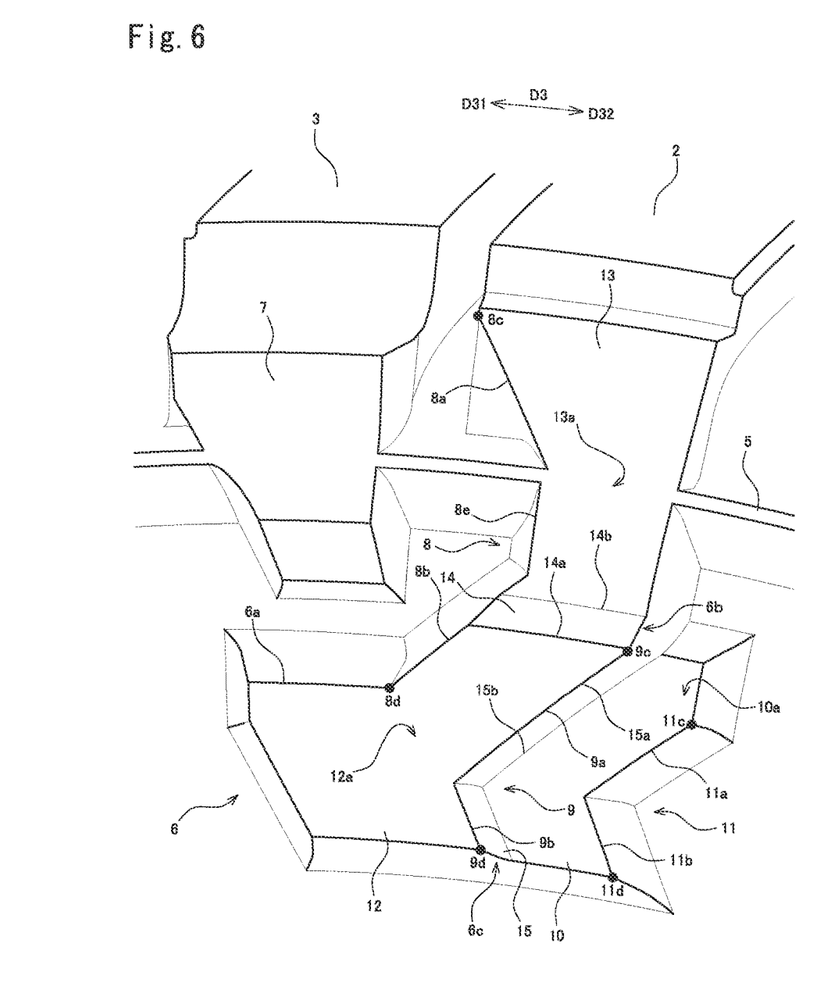
FIG. 6 is a perspective view as seen when viewed toward a location to the left from a location to the right of a sidewall associated with same embodiment.

As shown in FIG. 4 through FIG. 6, first side block 6 might, for example, comprise first recess 8 which opens so as to be directed toward the first circumferential direction D31, and second recess 9 which opens so as to be directed toward the second circumferential direction D32. Where this is the case, traction will be produced at recess(es) 8, 9 in correspondence to the rotational direction of tire 1.

When, for example, tire 1 rotates in the first circumferential direction D31, because sand, rock, mud, snow, and/or the like (hereinafter "sand, stones, and/or the like") will come in contact with first recess 8, traction will be produced at first recess 8; furthermore, when, for example, tire 1 rotates in the second circumferential direction D32, because sand, stones, and/or the like will come in contact with second recess 9, traction will be produced at second recess 9. Accordingly, it will be possible to improve performance with respect to traction regardless of the rotational direction of tire 1.

Respective recesses 8, 9 may, for example, comprise outer recess edges 8a, 9a which are inclined with respect to the tire radial direction D2, and inner recess edges 8b, 9b which are inclined with respect to the tire radial direction D2 and which are arranged toward the interior in the tire radial direction D2 from outer recess edges 8a, 9a. Where this is the case, because this will increase the tendency for sand, stones, and/or the like to make contact with recess(es) 8, 9, this will make it possible to further improve performance with respect to traction. Note that what is meant by inclined is that the angle of intersection is not less than 10°.

First outer recess edge 8a may, for example, extend so as to be increasingly disposed in the first circumferential direction D31 as one proceeds toward the exterior in the tire radial direction D2; first inner recess edge 8b may, for example, extend so as to be increasingly disposed in the first circumferential direction D31 as one proceeds toward the interior in the tire radial direction D2. That is, in such case, the direction in which first outer recess edge 8a would be inclined with respect to the tire radial direction D2 would be opposite the direction in which first inner recess edge 8b would be inclined with respect to the tire radial direction D2. In addition, the outer end of first outer recess edge 8a might, for example, be outer end 8c in the tire radial direction D2 of first recess 8; and the inner end of first inner recess edge 8b might, for example, be inner end 8d in the tire radial direction D2 of first recess 8.

Second outer recess edge 9a may, for example, extend so as to be increasingly disposed in the second circumferential direction D32 as one proceeds toward the exterior in the tire radial direction D2; second inner recess edge 9b may, for example, extend so as to be increasingly disposed in the second circumferential direction D32 as one proceeds toward the interior in the tire radial direction D2. That is, in such case, the direction in which second outer recess edge 9a would be inclined with respect to the tire radial direction D2 would be opposite the direction in which second inner recess edge 9b would be inclined with respect to the tire radial direction D2. In addition, the outer end of second outer recess edge 9a might, for example, be outer end 9c in the tire radial direction D2 of second recess 9; and the inner end of second inner recess edge 9b might, for example, be inner end 9d in the tire radial direction D2 of second recess 9.

Moreover, the inner end in the tire radial direction D2 of first outer recess edge 8a may, e.g., as is the case in the present embodiment, be arranged toward the exterior in the tire radial direction D2 from the outer end in the tire radial direction D2 of second outer recess edge 9a. That is, the entirety of first outer recess edge 8a may be arranged toward the exterior in the tire radial direction D2 from the entirety of second outer recess edge 9a.

Furthermore, the inner end in the tire radial direction D2 of first inner recess edge 8b may, e.g., as is the case in the present embodiment, be arranged toward the exterior in the tire radial direction D2 from the outer end in the tire radial direction D2 of second inner recess edge 9b. That is, the entirety of first inner recess edge 8b may be arranged toward the exterior in the tire radial direction D2 from the entirety of second inner recess edge 9b.

Where this is the case, in accordance with present embodiment, the center in the tire radial direction D2 (midpoint of straight line connecting outer end 8c and inner end 8d) of first recess 8 will be arranged toward the exterior in the tire radial direction D2 from the center in the tire radial direction D2 (midpoint of straight line connecting outer end 9c and inner end 9d) of second recess 9. Accordingly, during driving, tire 1 will be such that first recess 8 is disposed near the ground.

In this regard, first recess 8 may, e.g., as is the case in the present embodiment, comprise intermediate recess edge 8e which is arranged between first outer recess edge 8a and first inner recess edge 8b. Intermediate recess edge 8e may extend so as to be respectively contiguous with first outer recess edge 8a and first inner recess edge 8b and so as to be parallel (here and below understood to mean not only the situation in which the angle of intersection is 0° but to also include situations in which this is less than) 10° to the tire radial direction D2.

This will make it possible to increase the dimension in the tire radial direction D2 of first recess 8. Accordingly, because this will increase the tendency for sand, stones, and/or the like to make contact with first recess 8 which is disposed near the ground, this will make it possible to efficiently improve performance with respect to traction.

A constitution may be adopted in which, e.g., as is the case in the present embodiment, intermediate recess edge 8e is indirectly connected to first outer recess edge 8a by way of annular projection 5, but intermediate recess edge 8e is contiguous with (directly connected to) first inner recess edge 8b. Note, however, that intermediate recess edge 8e may, for example, be contiguous with (directly connected to) first outer recess edge 8a. Furthermore, intermediate recess edge 8e may, for example, be indirectly connected to first inner recess edge 8b.

Moreover, to address the fact that the dimension of first recess 8 is large, second side block 7 may, for example, be arranged so as to be separated and in the first circumferential direction D31 from first recess 8. In addition, the inner end in the tire radial direction D2 of second side block 7 may, e.g., as is the case in the present embodiment, be arranged toward the exterior in the tire radial direction D2 from the inner end (i.e., inner end 8d of first recess 8) in the tire radial direction D2 of first inner recess edge 8b.

Because this will cause second side block 7 to be disposed near first recess 8, this will make it possible to suppress decrease in performance with respect to protection due to first recess 8. Moreover, the outer end in the tire radial direction D2 of second side block 7 may, e.g., as is the case in the present embodiment, be arranged toward the interior in the tire radial direction D2 from the outer end (i.e., outer end 8c of first recess 8) in the tire radial direction D2 of first outer recess edge 8a.

Furthermore, first side block 6 may, e.g., as is the case in the present embodiment, comprise circumferential edge 6a which extends in the first circumferential direction D31 from inner end 8d of first recess 8. In addition, circumferential edge 6a may, for example, extend so as to be parallel to the tire circumferential direction D3. Furthermore, circumferential edge 6a may, for example, be arranged toward the interior in the tire radial direction D2 from second side block 7. Moreover, circumferential edge 6a and second side block 7 may, e.g., as is the case in the present embodiment, respectively intersect a common second tire meridional plane S3 (see FIG. 3).

Furthermore, the center in the tire radial direction D2 of second recess 9 may, e.g., as is the case in the present embodiment, be arranged so as to be nearer than the center in the tire radial direction D2 of first recess 8 to tire maximum width location 22b. Where this is the case, during driving, tire 1 will be such that impacting objects (e.g., rocks, curbstones, and so forth), for example, will tend to impact locations peripheral to tire maximum width location 22b, i.e., locations peripheral to second recess 9.

To address this, second outer recess edge 9a may, e.g., as is the case in the present embodiment, be contiguous with second inner recess edge 9b. This will make it possible to suppress excessive increase in the dimension in the tire radial direction D2 of second recess 9. Accordingly, it will be possible to efficiently suppress decrease in performance with respect to protection.

While there is no particular limitation with respect thereto, it is preferred that distance W3 (see FIG. 4) between tire maximum width location 22b and the inner end in the tire radial direction D2 of first side block 6 be within 10% of the height dimension W2 (see FIG. 1) of tire 1 in the tire radial direction D2. Note that height dimension W2 of tire 1 is the distance between the inner end and the outer end in the tire radial direction D2 of tire 1.

Furthermore, first side block 6 may, e.g., as is the case in the present embodiment, comprise reinforcing region 10 which is contiguous with second recess 9. Where this is the case, because reinforcing region 10 will reinforce second recess 9, this will make it possible to improve performance with respect to protection at locations peripheral to second recess 9. What is more, because this will make it possible to increase the rigidity of recess edges 9a, 9b of second recess 9, this will, for example, make it possible to increase traction produced by recess edges 9a, 9b of second recess 9.

Reinforcing region 10 may, e.g., as is the case in the present embodiment, comprise third recess 11 which opens so as to be directed toward the second circumferential direction D32. In addition, third recess 11 might, for example, comprise third outer recess edge 11a which is inclined with respect to the tire radial direction D2, and third inner recess edge 11b which is inclined with respect to the tire radial direction D2 and which is arranged toward the interior in the tire radial direction D2 from third outer recess edge 11a.

Where this is the case, because this will increase the tendency for sand, stones, and/or the like to make contact with third recess 11, this will make it possible to further improve performance with respect to traction. Moreover, third outer recess edge 11a may, for example, extend so as to be increasingly disposed in the second circumferential direction D32 as one proceeds toward the exterior in the tire radial direction D2; third inner recess edge 11b may, for example, extend so as to be increasingly disposed in the second circumferential direction D32 as one proceeds toward the interior in the tire radial direction D2.

The outer end of third outer recess edge 11a might, for example, be outer end 11c in the tire radial direction D2 of third recess 11; and the inner end of third inner recess edge 11b might, for example, be inner end 11d in the tire radial direction D2 of third recess 11. Moreover, the dimension (distance in the tire radial direction D2 between outer end 9c and inner end 9d) in the tire radial direction D2 of second recess 9 may, e.g., as is the case in the present embodiment, be greater than the dimension (distance in the tire radial direction D2 between outer end 11c and inner end 11d) in the tire radial direction D2 of third recess 11.

While there is no particular limitation with respect thereto, angles θ1, θ2, θ3 between outer recess edges 8a, 9a, 11a and inner recess edges 8b, 9b, 11b might, for example, appear to be not less than 30° as viewed in the tire axial direction D1. In addition, it is, for example, preferred that angles θ1, θ2, θ3 between outer recess edges 8a, 9a, 11a and inner recess edges 8b, 9b, 11b appear to be not less than 60° as viewed in the tire axial direction D1.

This will make it possible, for example, to suppress occurrence of situations in which sand, stones, and/or the like become lodged in recesses 8, 9, 11. Furthermore, because this would, for example, increase the dimensions in the tire radial direction D2 of recesses 8, 9, 11, because this will increase the tendency for sand, stones, and/or the like to make contact with recesses 8, 9, 11, this will make it possible to improve performance with respect to traction.

While there is no particular limitation with respect thereto, angles θ1, θ2, θ3 between outer recess edges 8a, 9a, 11a and inner recess edges 8b, 9b, 11b might, for example, appear to be not greater than 150° as viewed in the tire axial direction D1. In addition, it is, for example, preferred that angles θ1, θ2, θ3 between outer recess edges 8a, 9a, 11a and inner recess edges 8b, 9b, 11b appear to be not greater than 120° as viewed in the tire axial direction D1. Where this is the case, because it will be possible, for example, to suppress occurrence of situations in which the dimensions in the tire radial direction D2 of recesses 8, 9, 11 become excessively large, this will make it possible to suppress decrease in performance with respect to protection.

It so happens that while increasing the heights by which side blocks 6, 7 protrude will make it possible to improve performance with respect to protection and performance with respect to traction, it will also cause the weight of tire 1 to increase. To address this, as shown in FIG. 4 through FIG. 7, first side block 6 might, for example, comprise first region 12, second region 13, and first step 6b formed between first region 12 and second region 13.

Figure 7:
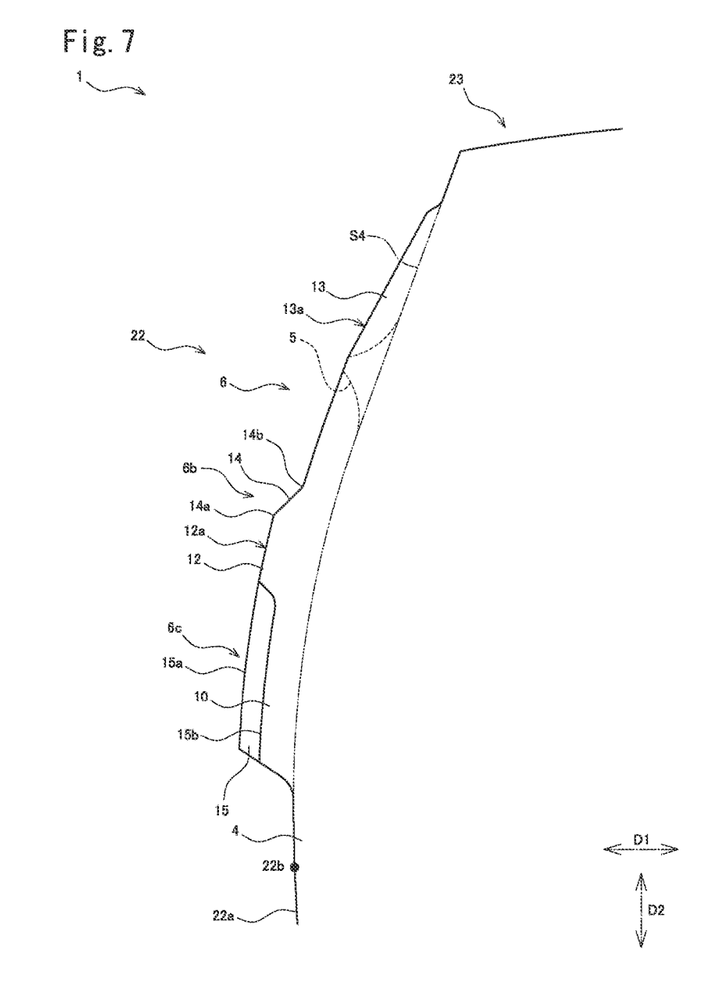
FIG. 7 is a sectional view of the principal components in a section taken along VII-VII in FIG. 4.

For example, first region 12 may comprise first apical surface 12a which is the outer surface thereof in the tire axial direction D1; second region 13 may comprise second apical surface 13a which is the outer surface thereof in the tire axial direction D1; and first step 6b may be made up of first apical surface 12a, second apical surface 13a, and first connecting surface 14 which connects first apical surface 12a and second apical surface 13a. In addition, first step 6b might, for example, be formed by a difference in heights by which first region 12 and second region 13 protrude.

More specifically, a constitution may be adopted in which first connecting surface 14 comprises first contiguous portion 14a which is contiguous with first apical surface 12a, and second contiguous portion 14b which is contiguous with second apical surface 13a; and in which the height by which first contiguous portion 14a protrudes is greater than the height by which second contiguous portion 14b protrudes. Where this is the case, not only will there be a first region 12 having large protruding height but there will also be a second region 13 having small protruding height.

Accordingly, it will be possible to suppress increase in the weight of tire 1 while achieving both performance with respect to protection and performance with respect to traction. As a result, when tire 1 is mounted on a vehicle and the vehicle is driven, it will be possible, for example, to suppress worsening of fuel efficiency.

Furthermore, it will be possible to suppress occurrence of nonuniformity with regard to weight balance in the tire circumferential direction D3 of tire 1 due to first side block(s) 6, for example. This will make it possible to suppress reduction in uniformity when tire 1 is mounted on a vehicle, for example.

Furthermore, first region 12 might, e.g., as is the case in the present embodiment, be arranged toward the interior in the tire radial direction D2 from second region 13. Where this is the case, because the height by which first contiguous portion 14a protrudes will be greater than the height by which second contiguous portion 14b protrudes, first connecting surface 14 will be directed toward the exterior in the tire radial direction D2, which is to say that it will be directed toward the ground. Accordingly, traction in the tire radial direction D2 will be produced at first connecting surface 14.

Moreover, first connecting surface 14 may, e.g., as is the case in the present embodiment, extend so as to be parallel to the tire circumferential direction D3. Where this is the case, traction in the tire radial direction D2 will be effectively produced at first connecting surface 14. Accordingly, it will, for example, be possible to improve performance with respect to traction.

Note, moreover, that first recess 8 may, e.g., as is the case in the present embodiment, be formed so as to extend across first region 12 and second region 13. Furthermore, second recess 9 may, e.g., as is the case in the present embodiment, be arranged in first region 12. In addition, first side block 6 might, for example, comprise second step 6c formed between first region 12 and reinforcing region 10.

For example, reinforcing region 10 may comprise third apical surface 10a which is the outer surface thereof in the tire axial direction D1; and second step 6c may be made up of first apical surface 12a, third apical surface 10a, and second connecting surface 15 which connects first apical surface 12a and third apical surface 10a. In addition, second step 6c might, for example, be formed by a difference in heights by which first region 12 and reinforcing region 10 protrude.

More specifically, a constitution may be adopted in which second connecting surface 15 comprises third contiguous portion 15a which is contiguous with first apical surface 12a, and fourth contiguous portion 15b which is contiguous with third apical surface 10a; and in which the height by which third contiguous portion 15a protrudes is greater than the height by which fourth contiguous portion 15b protrudes. Where this is the case, second connecting surface 15 will constitute second recess 9, and third contiguous portion 15a will constitute recess edges 9a, 9b of second recess 9.

Figure 8:
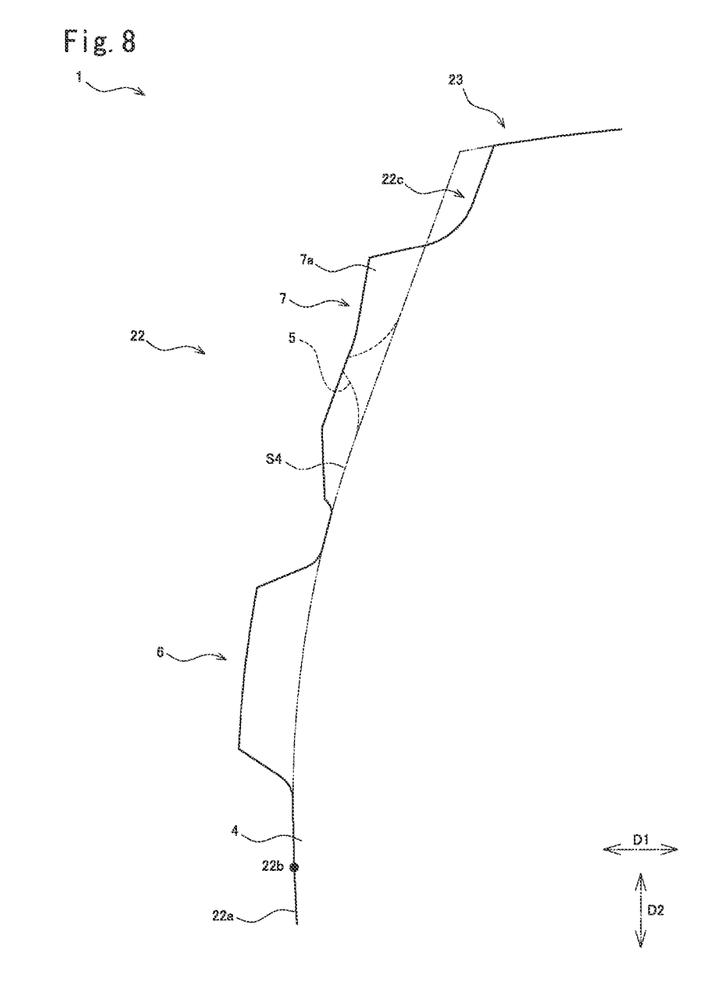
FIG. 8 is a sectional view of the principal components in a section taken along VIII-VIII in FIG. 4.
Figure 9:
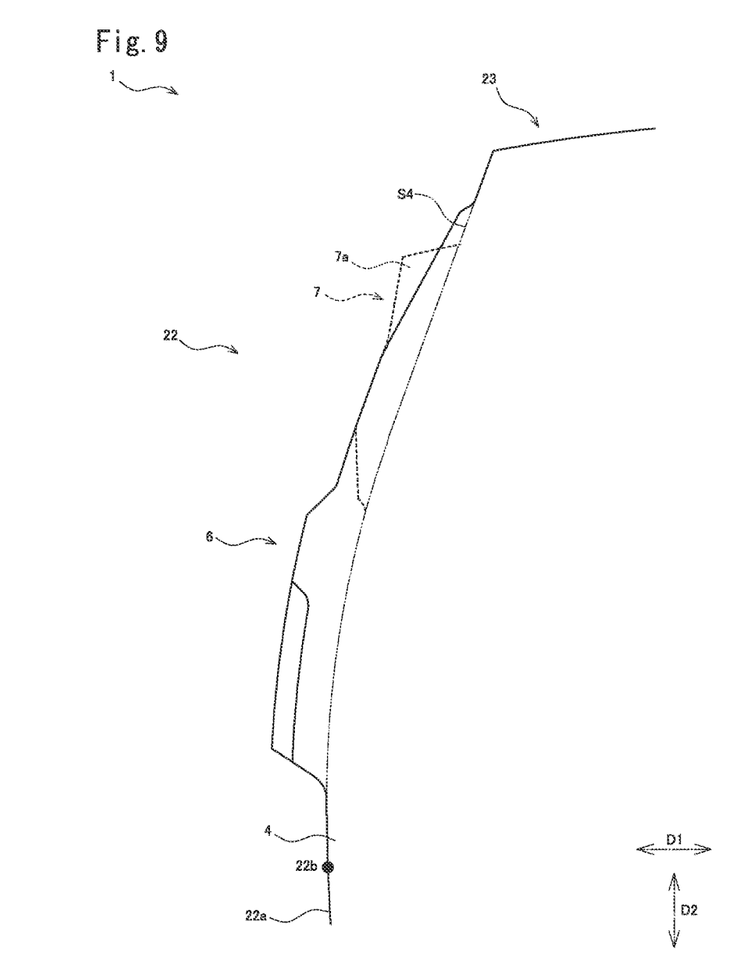
FIG. 9 is a drawing in which the first side block of FIG. 7 and the second side block of FIG. 8 are placed one atop the other.

As shown in FIG. 7 through FIG. 9, annular projection 5 protrudes in the tire axial direction D1 from sidewall reference surface S4, and side blocks 6, 7 protrude in the tire axial direction D1 from sidewall reference surface S4. Note that FIG. 9 is a drawing in which first side block 6 of FIG. 7 is shown in solid line, and second side block 7 of FIG. 8 is shown in broken line, these being placed one atop the other.

In addition, what is referred to as the protruding heights of side blocks 6, 7, respective regions 10, 12, 13, and respective portions 14a, 14b, 15a, 15b might be taken to be the heights of protrusion thereof in a direction normal to sidewall reference surface S4 from sidewall reference surface S4. Note that sidewall reference surface S4 is also referred to as the profile surface of sidewall 22.

Sidewall reference surface S4 might, e.g., as is the case in the present embodiment, be made up of the outer end surface in the tire axial direction D1 of rubber main body 4. In addition, in tire meridional sections S2, S3, sidewall reference surface S4 might, for example, be made up of straight line(s) and a plurality of arcs having differing radii of curvature.

Moreover, within the range in the tire radial direction D2 at which side blocks 6, 7 are located, in tire meridional sections S2, S3, in order from the exterior in the tire radial direction D2, sidewall reference surface S4 may, e.g., as is the case in the present embodiment, be made up of one straight line and one arc. In addition, said arc may be continuous with arc(s) of sidewall reference surface S4 at portion(s) adjacent and toward the interior in the tire radial direction D2 from side blocks 6, 7.

As shown in FIG. 8, sidewall rubber 22a might, for example, comprise side recess 22c which is recessed in the tire axial direction D1 relative to sidewall reference surface S4 at a location toward the exterior in the tire radial direction D2 from second side block 7.

Furthermore, as shown in FIG. 8 and FIG. 9, second side block 7 may, e.g., as is the case in the present embodiment, comprise high region 7a which appears to protrude by a height greater than that of first side block 6 as viewed in the tire circumferential direction D3. In addition, high region 7a may, e.g., as is the case in the present embodiment, be arranged toward the exterior in the tire radial direction D2 from annular projection 5.

As shown in FIG. 9, the outer end in the tire radial direction D2 of first side block 6 may, for example, be arranged toward the exterior in the tire radial direction D2 from the outer end in the tire radial direction D2 of second side block 7. Furthermore, the inner end in the tire radial direction D2 of first side block 6 may, for example, be arranged toward the interior in the tire radial direction D2 from the inner end in the tire radial direction D2 of second side block 7.

As described above, as in the present embodiment, it is preferred that
the tire 1 comprises a first side block 6 that protrudes in a tire axial direction D1 from a sidewall reference surface S4, wherein
the first side block 6 comprises a first recess 8 which opens so as to be directed toward a first circumferential direction D31, and a second recess 9 which opens so as to be directed toward a second circumferential direction D32 which is opposite the first circumferential direction D31 in a tire circumferential direction D3;
the first recess 8 comprises a first outer recess edge 8a which is inclined with respect to a tire radial direction D2, and a first inner recess edge 8b which is inclined with respect to the tire radial direction D2 and which is arranged toward an interior in the tire radial direction D2 from the first outer recess edge 8a;
the first outer recess edge 8a extends so as to be increasingly disposed in the first circumferential direction D31 as one proceeds toward an exterior in the tire radial direction D2;
the first inner recess edge 8b extends so as to be increasingly disposed in the first circumferential direction D31 as one proceeds toward the interior in the tire radial direction D2;
the second recess 9 comprises a second outer recess edge 9a which is inclined with respect to the tire radial direction D2, and a second inner recess edge 9b which is inclined with respect to the tire radial direction D2 and which is arranged toward the interior in the tire radial direction D2 from the second outer recess edge 9a;
the second outer recess edge 9a extends so as to be increasingly disposed in the second circumferential direction D32 as one proceeds toward the exterior in the tire radial direction D2;
the second inner recess edge 9b extends so as to be increasingly disposed in the second circumferential direction D32 as one proceeds toward the interior in the tire radial direction D2; and
the first side block 6 comprises a first region 12, a second region 13, and a first step 6b which is between the first region 12 and the second region 13 and which is formed by a difference in heights by which the first region 12 and the second region 13 protrude.

In accordance with such constitution, because first step 6b is formed by the difference in heights by which first region 12 and second region 13 protrude, not only will there be a region having large protruding height but there will also be a region having small protruding height. This will make it possible to suppress increase in weight while permitting achievement of both performance with respect to protection and performance with respect to traction.

Further, as in the present embodiment, it is preferred that the tire 1 includes a configuration in which:
the first region 12 is arranged toward the interior in the tire radial direction D2 from the second region 13;
the first region 12 comprises a first apical surface 12a which is an outer surface in the tire axial direction D1;
the second region 13 comprises a second apical surface 13a which is an outer surface in the tire axial direction D1;
the first step 6b comprises a first connecting surface 14 which connects the first apical surface 12a and the second apical surface 13a;
the first connecting surface 14 comprises a first contiguous portion 14a which is contiguous with the first apical surface 12a, and a second contiguous portion 14b which is contiguous with the second apical surface 13a; and
a height by which the first contiguous portion 14a protrudes is greater than a height by which the second contiguous portion 14b protrudes.

In accordance with such constitution, first region 12 is arranged toward the interior in the tire radial direction D2 from second region 13, and the height by which first contiguous portion 14a of first connecting surface 14 protrudes is greater than the height by which second contiguous portion 14b of first connecting surface 14 protrudes. Because this will cause traction in the tire radial direction D2 to be produced at first connecting surface 14, this will make it possible to improve performance with respect to traction.

Further, as in the present embodiment, it is preferred that the tire 1 includes a configuration in which:

a center in the tire radial direction D2 of the first recess 8 is arranged toward the exterior in the tire radial direction D2 from a center in the tire radial direction D2 of the second recess 9;

the first recess 8 further comprises an intermediate recess edge 8e which is arranged between the first outer recess edge 8a and the first inner recess edge 8b; and the intermediate recess edge 8e extends so as to be parallel to the tire radial direction D2 and is respectively connected to the first outer recess edge 8a and the first inner recess edge 8b.

In accordance with such constitution, to address the fact that, during driving, tire 1 will be such that first recess 8 is disposed near the ground, first recess 8 comprises intermediate recess edge 8e which extends in the tire radial direction D2 at a location between first outer recess edge 8a and first inner recess edge 8b. Because this will make it possible to increase the dimension in the tire radial direction D2 of first recess 8 which is near to the ground, this will increase the tendency for sand, stones, and/or the like to make contact with first recess 8. Accordingly, it will be possible to efficiently improve performance with respect to traction.

Further, as in the present embodiment, it is preferred that the tire 1 includes a configuration in which:

the tire 1 further comprises a second side block 7 that protrudes in the tire axial direction D1 from the sidewall reference surface S4, wherein the second side block 7 is arranged so as to be separated and in the first circumferential direction D31 from the first recess 8;

an inner end in the tire radial direction D2 of the second side block 7 is arranged toward the exterior in the tire radial direction D2 from an inner end in the tire radial direction D2 of the first inner recess edge 8b; and a common tire meridional plane S3 is respectively intersected by the first side block 6 and the second side block 7.

In accordance with such constitution, to address the fact that the dimension in the tire radial direction D2 of first recess 8 is large, second side block 7 is disposed near first recess 8. This makes it possible to suppress decrease in performance with respect to protection due to first recess 8.

Further, as in the present embodiment, it is preferred that the tire 1 includes a configuration in which:

a center in the tire radial direction D2 of the second recess 9 is arranged so as to be nearer than a center in the tire radial direction D2 of the first recess 8 to a tire maximum width location 22b; and the second outer recess edge 9a is contiguous with the second inner recess edge 9b.

In accordance with such constitution, to address the fact that, during driving, tire 1 is such that impacting objects (e.g., rocks, curbstones, and so forth), for example, tend to impact locations peripheral to tire maximum width location 22b, second outer recess edge 9a is made to be contiguous with second inner recess edge 9b. As a result, because it will be possible to suppress occurrence of a situation in which the dimension in the tire radial direction D2 of second recess 9 which is near tire maximum width location 22b might otherwise become excessively large, it will be possible to suppress decrease in performance with respect to protection.

The tire 1 is not limited to the configuration of the embodiment described above, and the effects are not limited to those described above. It goes without saying that the tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of tire 1 associated with the foregoing embodiment is such that first region 12 is arranged toward the interior in the tire radial direction D2 from second region 13. However, tire 1 is not limited to such constitution. For example, it is also possible to adopt a constitution in which first region 12 is arranged toward the exterior in the tire radial direction D2 from second region 13. Furthermore, it is also possible to adopt a constitution in which, for example, first region 12 is arranged in the first circumferential direction D31 (or the second circumferential direction D32) from second region 13.

(2) Furthermore, the constitution of tire 1 associated with the foregoing embodiment is such that first recess 8 comprises intermediate recess edge 8e which is arranged between first outer recess edge 8a and first inner recess edge 8b. However, tire 1 is not limited to such constitution. For example, it is also possible to adopt a constitution in which, at first recess 8, first outer recess edge 8a is contiguous with first inner recess edge 8b.

(3) Furthermore, the constitution of tire 1 associated with the foregoing embodiment is such that, at second recess 9, second outer recess edge 9a is contiguous with second inner recess edge 9b. However, tire 1 is not limited to such constitution. For example, it is also possible to adopt a constitution in which second recess 9 comprises an intermediate recess edge which is arranged between second outer recess edge 9a and second inner recess edge 9b. In addition, it is also possible to adopt a constitution in which said intermediate recess edge extends so as to be parallel to the tire radial direction D2 and is respectively connected to second outer recess edge 9a and second inner recess edge 9b.

(4) Furthermore, the constitution of tire 1 associated with the foregoing embodiment is such that the inner end in the tire radial direction D2 of second side block 7 is arranged toward the exterior in the tire radial direction D2 from the inner end in the tire radial direction D2 of first inner recess edge 8b. However, tire 1 is not limited to such constitution. For example, it is also possible to adopt a constitution in which the inner end in the tire radial direction D2 of second side block 7 is arranged toward the interior in the tire radial direction D2 from the inner end in the tire radial direction D2 of first inner recess edge 8b.

(5) Furthermore, the constitution of tire 1 associated with the foregoing embodiment is such that second side block 7 intersects a tire meridional plane S3 in common thereto with first side block 6. However, tire 1 is not limited to such constitution. For example, it is also possible to adopt a constitution in which second side block 7 does not intersect a tire meridional plane S3 in common thereto with first side block 6.

The invention claimed is:

1. A tire comprising a first side block that protrudes in a tire axial direction from a sidewall reference surface, wherein:

the first side block comprises a first recess which opens so as to be directed toward a first circumferential direction, and a second recess which opens so as to be directed toward a second circumferential direction which is opposite the first circumferential direction in a tire circumferential direction;

the first recess comprises a first outer recess edge which is inclined with respect to a tire radial direction, and a first inner recess edge which is inclined with respect to the tire radial direction and which is arranged toward an interior in the tire radial direction from the first outer recess edge;

the first outer recess edge extends so as to be increasingly disposed in the first circumferential direction as one proceeds toward an exterior in the tire radial direction;

the first inner recess edge extends so as to be increasingly disposed in the first circumferential direction as one proceeds toward the interior in the tire radial direction;

the second recess comprises a second outer recess edge which is inclined with respect to the tire radial direction, and a second inner recess edge which is inclined with respect to the tire radial direction and which is arranged toward the interior in the tire radial direction from the second outer recess edge;

the second outer recess edge extends so as to be increasingly disposed in the second circumferential direction as one proceeds toward the exterior in the tire radial direction;

the second inner recess edge extends so as to be increasingly disposed in the second circumferential direction as one proceeds toward the interior in the tire radial direction;

the first side block comprises a first region, a second region, and a first step which is between the first region and the second region and which is formed by a difference in heights by which the first region and the second region protrude;

the first region is arranged toward the interior in the tire radial direction from the second region;

the first region comprises a first apical surface which is an outer surface in the tire axial direction;

the second region comprises a second apical surface which is an outer surface in the tire axial direction;

the first step comprises a first connecting surface which connects the first apical surface and the second apical surface;

the first connecting surface comprises a first contiguous portion which is contiguous with the first apical surface, and a second contiguous portion which is contiguous with the second apical surface;

a height by which the first contiguous portion protrudes is greater than a height by which the second contiguous portion protrudes;

the first recess is arranged so as to extend across the first region and the second region; and the second recess is arranged at a location which is in the first region but is separated from the second region.

2. The tire according to claim 1 wherein
the first side block further comprises a reinforcing region which is contiguous with the second recess;
the second recess is arranged at a location which is in the first region but is separated from the second region; and
the first side block further comprises a second step which is formed by a difference in heights by which the first region and the reinforcing region protrude.

3. The tire according to claim 2 wherein
the reinforcing region comprises a third apical surface which is an outer surface in the tire axial direction;
the second step comprises a second connecting surface which connects the first apical surface and the third apical surface;
the second connecting surface comprises a third contiguous portion which is contiguous with the first apical surface, and a fourth contiguous portion which is contiguous with the third apical surface; and
a height by which the third contiguous portion protrudes is greater than a height by which the fourth contiguous portion protrudes.

4. The tire according to claim 1 wherein
a center in the tire radial direction of the second recess is arranged so as to be nearer than a center in the tire radial direction of the first recess to a tire maximum width location; and
the second outer recess edge is contiguous with the second inner recess edge.

5. The tire according to claim 4 wherein an entirety of the first outer recess edge is arranged toward the exterior in the tire radial direction from an entirety of the second outer recess edge.

6. The tire according to claim 5 wherein an entirety of the first inner recess edge is arranged toward the exterior in the tire radial direction from an entirety of the second inner recess edge.

7. A tire comprising a first side block that protrudes in a tire axial direction from a sidewall reference surface, wherein:
the first side block comprises a first recess which opens so as to be directed toward a first circumferential direction, and a second recess which opens so as to be directed toward a second circumferential direction which is opposite the first circumferential direction in a tire circumferential direction;
the first recess comprises a first outer recess edge which is inclined with respect to a tire radial direction, and a first inner recess edge which is inclined with respect to the tire radial direction and which is arranged toward an interior in the tire radial direction from the first outer recess edge;
the first outer recess edge extends so as to be increasingly disposed in the first circumferential direction as one proceeds toward an exterior in the tire radial direction;
the first inner recess edge extends so as to be increasingly disposed in the first circumferential direction as one proceeds toward the interior in the tire radial direction;
the second recess comprises a second outer recess edge which is inclined with respect to the tire radial direction, and a second inner recess edge which is inclined with respect to the tire radial direction and which is arranged toward the interior in the tire radial direction from the second outer recess edge;
the second outer recess edge extends so as to be increasingly disposed in the second circumferential direction as one proceeds toward the exterior in the tire radial direction;
the second inner recess edge extends so as to be increasingly disposed in the second circumferential direction as one proceeds toward the interior in the tire radial direction;
the first side block comprises a first region, a second region, and a first step which is between the first region and the second region and which is formed by a difference in heights by which the first region and the second region protrude; and
the first side block further comprises a reinforcing region which is contiguous with the second recess.

8. The tire according to claim 7 wherein the reinforcing region comprises a third recess which opens so as to be directed toward the second circumferential direction.

9. The tire according to claim 8 wherein a dimension in the tire radial direction of the second recess is greater than a dimension in the tire radial direction of the third recess.

10. The tire according to claim 8 wherein the third recess comprises a third outer recess edge which is inclined with respect to the tire radial direction, and a third inner recess edge which is inclined with respect to the tire radial direction and which is arranged toward the interior in the tire radial direction from the third outer recess edge.

11. The tire according to claim 10 wherein the third outer recess edge is contiguous with the third inner recess edge.

12. A tire comprising a first side block that protrudes in a tire axial direction from a sidewall reference surface, wherein:
the first side block comprises a first recess which opens so as to be directed toward a first circumferential direction, and a second recess which opens so as to be directed toward a second circumferential direction which is opposite the first circumferential direction in a tire circumferential direction;
the first recess comprises a first outer recess edge which is inclined with respect to a tire radial direction, and a first inner recess edge which is inclined with respect to the tire radial direction and which is arranged toward an interior in the tire radial direction from the first outer recess edge;
the first outer recess edge extends so as to be increasingly disposed in the first circumferential direction as one proceeds toward an exterior in the tire radial direction;
the first inner recess edge extends so as to be increasingly disposed in the first circumferential direction as one proceeds toward the interior in the tire radial direction;
the second recess comprises a second outer recess edge which is inclined with respect to the tire radial direction, and a second inner recess edge which is inclined with respect to the tire radial direction and which is arranged toward the interior in the tire radial direction from the second outer recess edge;
the second outer recess edge extends so as to be increasingly disposed in the second circumferential direction as one proceeds toward the exterior in the tire radial direction;
the second inner recess edge extends so as to be increasingly disposed in the second circumferential direction as one proceeds toward the interior in the tire radial direction;
the first side block comprises a first region, a second region, and a first step which is between the first region and the second region and which is formed by a difference in heights by which the first region and the second region protrude;
a center in the tire radial direction of the first recess is arranged toward the exterior in the tire radial direction from a center in the tire radial direction of the second recess;
the first recess further comprises an intermediate recess edge which is arranged between the first outer recess edge and the first inner recess edge; and
the intermediate recess edge extends so as to be parallel to the tire radial direction and is respectively connected to the first outer recess edge and the first inner recess edge.

13. The tire according to claim 12 further comprising a second side block that protrudes in the tire axial direction from the sidewall reference surface, wherein
the second side block is arranged so as to be separated and in the first circumferential direction from the first recess;
an inner end in the tire radial direction of the second side block is arranged toward the exterior in the tire radial direction from an inner end in the tire radial direction of the first inner recess edge; and
a common tire meridional plane is respectively intersected by the first side block and the second side block.

14. The tire according to claim 13 wherein
the first side block further comprises a circumferential edge which extends in the first circumferential direction from an inner end in the tire radial direction of the first recess; and
the circumferential edge intersects the common tire meridional plane.

15. The tire according to claim 13 wherein an outer end in the tire radial direction of the second side block is arranged toward the interior in the tire radial direction from an outer end in the tire radial direction of the first side block.

16. The tire according to claim 15 wherein an outer end in the tire radial direction of the second side block is arranged toward the interior in the tire radial direction from an outer end in the tire radial direction of the first outer recess edge.

17. The tire according to claim 13 wherein the second side block comprises a high region which appears to protrude by a height greater than that of the first side block as viewed in the tire circumferential direction.

18. The tire according to claim 17 further comprising an annular projection that extends in the tire circumferential direction from the first side block to the second side block, wherein
the high region is arranged toward the exterior in the tire radial direction from the annular projection.

* * * * *